US010776243B1

(12) United States Patent
Kochar

(10) Patent No.: US 10,776,243 B1
(45) Date of Patent: Sep. 15, 2020

(54) PREDICTION TOOL

(71) Applicant: Bank of America Corporation, Charlotte, NC (US)

(72) Inventor: Sarabjeet Singh Kochar, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 24 days.

(21) Appl. No.: 16/357,497

(22) Filed: Mar. 19, 2019

(51) Int. Cl.
*G06F 11/34* (2006.01)
*G06F 16/955* (2019.01)
*G06F 3/0484* (2013.01)

(52) U.S. Cl.
CPC ...... *G06F 11/3438* (2013.01); *G06F 3/04842* (2013.01); *G06F 11/3476* (2013.01); *G06F 16/955* (2019.01)

(58) Field of Classification Search
USPC ........................................................ 709/224
See application file for complete search history.

(56) References Cited

U.S. PATENT DOCUMENTS

| | | | |
|---|---|---|---|
| 5,572,221 A | 11/1996 | Marlevi | |
| 6,876,903 B2 | 4/2005 | Takenaka | |
| 6,957,074 B2 | 10/2005 | Wang | |
| 7,574,661 B2 | 8/2009 | Matsuura | |
| 7,707,131 B2 | 4/2010 | Chickering et al. | |
| 8,108,406 B2 | 1/2012 | Kenedy | |
| 8,131,271 B2 | 3/2012 | Ramer | |
| 8,429,103 B1 | 4/2013 | Aradhye | |
| 8,510,238 B1 | 8/2013 | Aradhye | |
| 8,566,696 B1 * | 10/2013 | Hamon | G06F 16/957 715/205 |
| 8,655,307 B1 | 2/2014 | Walker | |
| 8,972,318 B2 | 3/2015 | Prakash | |
| 9,208,678 B2 | 12/2015 | Albertson | |
| 9,381,916 B1 | 7/2016 | Zhu | |
| 10,176,800 B2 | 1/2019 | Chen et al. | |
| 2008/0214153 A1 | 9/2008 | Ramer | |
| 2008/0242279 A1 | 10/2008 | Ramer | |
| 2009/0043440 A1 | 2/2009 | Matsukawa | |
| 2009/0222313 A1 | 9/2009 | Kannan | |
| 2009/0248599 A1 | 10/2009 | Hueter | |
| 2010/0035225 A1 | 2/2010 | Kerfoot, III | |
| 2010/0106603 A1 | 4/2010 | Dey | |
| 2010/0169262 A1 | 7/2010 | Kenedy | |
| 2010/0169313 A1 | 7/2010 | Kenedy | |
| 2010/0169340 A1 | 7/2010 | Kenedy | |

(Continued)

*Primary Examiner* — Hermon Asres
(74) *Attorney, Agent, or Firm* — Michael A. Springs

(57) ABSTRACT

An apparatus includes a memory and processing circuitry. The memory stores a log for a user account. The log includes a first action performed by a user and a first date on which the first action was performed, a second action performed by the user and a second date on which the second action was performed, and a third action performed by the user and a third date on which the third action was performed. The processing circuitry receives a confirmation that a login occurred for the user account, determines a time of the login and first, second, and third scores for the first, second, and third actions. The prediction tool predicts that the first action is more likely to be performed than the second and third actions. The prediction tool presents, on a display, a first link that when activated, causes the first action to be performed.

17 Claims, 4 Drawing Sheets

(56) References Cited

U.S. PATENT DOCUMENTS

| | | |
|---|---|---|
| 2010/0169342 A1 | 7/2010 | Kenedy |
| 2011/0246059 A1 | 10/2011 | Tokashiki |
| 2011/0282964 A1 | 11/2011 | Krishnaswamy |
| 2011/0313664 A1 | 12/2011 | Sakai |
| 2011/0319094 A1 | 12/2011 | Usui |
| 2012/0023226 A1 | 1/2012 | Petersen |
| 2012/0059789 A1 | 3/2012 | Sakai |
| 2012/0089996 A1 | 4/2012 | Ramer |
| 2012/0100869 A1 | 4/2012 | Liang |
| 2012/0284080 A1 | 11/2012 | De Oliveira |
| 2012/0303573 A1 | 11/2012 | Pan |
| 2013/0046603 A1* | 2/2013 | Grigg ............... G06Q 30/0261 705/14.25 |
| 2013/0346347 A1 | 12/2013 | Patterson |
| 2014/0179279 A1 | 6/2014 | Skeba |
| 2014/0185581 A1 | 7/2014 | Senarath |
| 2014/0278688 A1 | 9/2014 | Sullivan |
| 2014/0372511 A1* | 12/2014 | Kapadia ................ G06N 5/04 709/203 |
| 2015/0038156 A1 | 2/2015 | Kilpatrick |
| 2015/0088662 A1* | 3/2015 | Noller ................ G06N 20/00 705/14.66 |
| 2015/0134304 A1 | 5/2015 | Guiver |
| 2015/0278837 A1 | 10/2015 | Lahav |
| 2015/0286820 A1 | 10/2015 | Sridhara |
| 2016/0102283 A1 | 4/2016 | Ravin et al. |
| 2016/0132827 A1 | 5/2016 | Gil |

* cited by examiner

PREDICTION TOOL

TECHNICAL FIELD

This disclosure relates generally to user interfaces.

BACKGROUND

Users typically interact with computers and mobile devices through user interfaces presented on a display of these devices.

SUMMARY OF THE DISCLOSURE

Users typically interact with computers and mobile devices through user interfaces presented on a display of these devices. Users view information presented in these interfaces (e.g., windows, menus, pages, etc.) and then provide input to the computer or mobile device through input devices (e.g., keyboard, mouse, touchscreen, etc.). The input can correspond to selection, activation, and/or responses to the information in these interfaces. By providing input, users can cause various actions to be performed in an underlying system.

In many instances, users may need to navigate through several layers of the interface before being able to perform a desired action. For certain actions, a user may need to navigate through one or more menus and several different pages before being allowed to provide input that performs those actions. For example, a user who wants to pay a bill may need to first navigate to an account page, pull down a payments menu, select a bill, and then pay the bill. As another example, a user who wants to transfer funds to a secondary account may need to first navigate to a source account page, pull down a transfer menu, select a destination account, and then transfer the funds. In each instance, the user ends up performing three or four different operations to perform one action. Each operation causes the system to load different pages and/or elements. If the user performs these actions regularly or periodically (e.g., monthly), then the user ends up spending significant time performing these intermediary operations and significant system resources (e.g., processing resources, network bandwidth, etc.) are expended loading intermediary pages and menus.

This disclosure contemplates a prediction tool that analyzes a history of a user's actions and predicts what action the user is likely to perform. The prediction tool then presents a shortcut (e.g., a link) to the user that allows the user to quickly perform the predicted action without having to navigate extra menu or pages. In this manner, the prediction tool conserves system resources by reducing the amount of processing resources and network bandwidth used to retrieve menus and pages. Additionally, the prediction tool reduces the amount of time a user spends navigating menus and pages to perform actions. Certain embodiments of the prediction tool are described below.

According to an embodiment, an apparatus includes a memory and processing circuitry. The memory stores a log for a user account. The log includes a first action performed by a user of the user account, a first date on which the first action was performed, a second action performed by the user of the user account, a second date on which the second action was performed, a third action performed by the user of the user account, and a third date on which the third action was performed. The processing circuitry receives a confirmation that a login occurred for the user account, determines, based on the confirmation, a time of the login, determines, based on the time of the login and the first date, a first score for the first action, determines, based on the time of the login and the second date, a second score for the second action, and determines, based on the time of the login and the third date, a third score for the third action. The prediction tool then predicts, based on the first score, the second score, and the third score, that the first action is more likely to be performed than the second action and the third action. In response to the prediction that the first action is more likely to be performed than the second action and the third action, the prediction tool presents, on a display, a first link that when activated, causes the first action to be performed.

According to another embodiment, a method includes storing, by a memory, a log for a user account. The log includes a first action performed by a user of the user account, a first date on which the first action was performed, a second action performed by the user of the user account, a second date on which the second action was performed, a third action performed by the user of the user account, and a third date on which the third action was performed. The method also includes receiving, by processing circuitry communicatively coupled to the memory, a confirmation that a login occurred for the user account, determining, by the processing circuitry, based on the confirmation, a time of the login, determining, by the processing circuitry, based on the time of the login and the first date, a first score for the first action, determining, by the processing circuitry, based on the time of the login and the second date, a second score for the second action, and determining, by the processing circuitry, based on the time of the login and the third date, a third score for the third action. The method further includes predicting, by the processing circuitry, based on the first score, the second score, and the third score, that the first action is more likely to be performed than the second action and the third action, and in response to the prediction that the first action is more likely to be performed than the second action and the third action, presenting, on a display, a first link that when activated, causes the first action to be performed.

According to yet another embodiment, a system includes a device and a prediction tool. The device includes a display. The prediction tool includes a memory and processing circuitry. The prediction tool stores a log for a user account. The log includes a first action performed by a user of the user account, a first date on which the first action was performed, a second action performed by the user of the user account, a second date on which the second action was performed, a third action performed by the user of the user account, and a third date on which the third action was performed. The prediction tool receives a confirmation that a login occurred for the user account, determines, based on the confirmation, a time of the login, determines, based on the time of the login and the first date, a first score for the first action, determines, based on the time of the login and the second date, a second score for the second action, and determines, based on the time of the login and the third date, a third score for the third action. The prediction tool then predicts, based on the first score, the second score, and the third score, that the first action is more likely to be performed than the second action and the third action, and in response to the prediction that the first action is more likely to be performed than the second action and the third action, present, on the display, a first link that when activated, causes the first action to be performed.

Certain embodiments provide one or more technical advantages. For example, an embodiment conserves system resources by reducing the amount of processing resources and network bandwidth used to retrieve menus and pages. As another example, an embodiment reduces the amount of time a user spends navigating menus and pages to perform actions. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

Users typically interact with computers and mobile devices through user interfaces presented on a display of these devices. Users view information presented in these interfaces (e.g., windows, menus, pages, etc.) and then provide input to the computer or mobile device through input devices (e.g., keyboard, mouse, touchscreen, etc.). The input can correspond to selection, activation, and/or responses to the information in these interfaces. By providing input, users can cause various actions to be performed in an underlying system.

In many instances, users may need to navigate through several layers of the interface before being able to perform a desired action. For certain actions, a user may need to navigate through one or more menus and several different pages before being allowed to provide input that performs those actions. For example, a user who wants to pay a bill may need to first navigate to an account page, pull down a payments menu, select a bill, and then pay the bill. As another example, a user who wants to transfer funds to a secondary account may need to first navigate to a source account page, pull down a transfer menu, select a destination account, and then transfer the funds. In each instance, the user ends up performing three or four different operations to perform one action. Each operation causes the system to load different pages and/or elements. If the user performs these actions regularly or periodically (e.g., monthly), then the user ends up spending significant time performing these intermediary operations and significant system resources (e.g., processing resources, network bandwidth, etc.) are expended loading intermediary pages and menus.

This disclosure contemplates a prediction tool that analyzes a history of a user's actions and predicts what action the user is likely to perform. The prediction tool then presents a shortcut (e.g., a link) to the user that allows the user to quickly perform the predicted action without having to navigate extra menu or pages. In this manner, the prediction tool conserves system resources by reducing the amount of processing resources and network bandwidth used to retrieve menus and pages. Additionally, the prediction tool reduces the amount of time a user spends navigating menus and pages to perform actions. The system and the prediction tool will be described in more detail using FIGS. 1 through 4.

Figure 1:
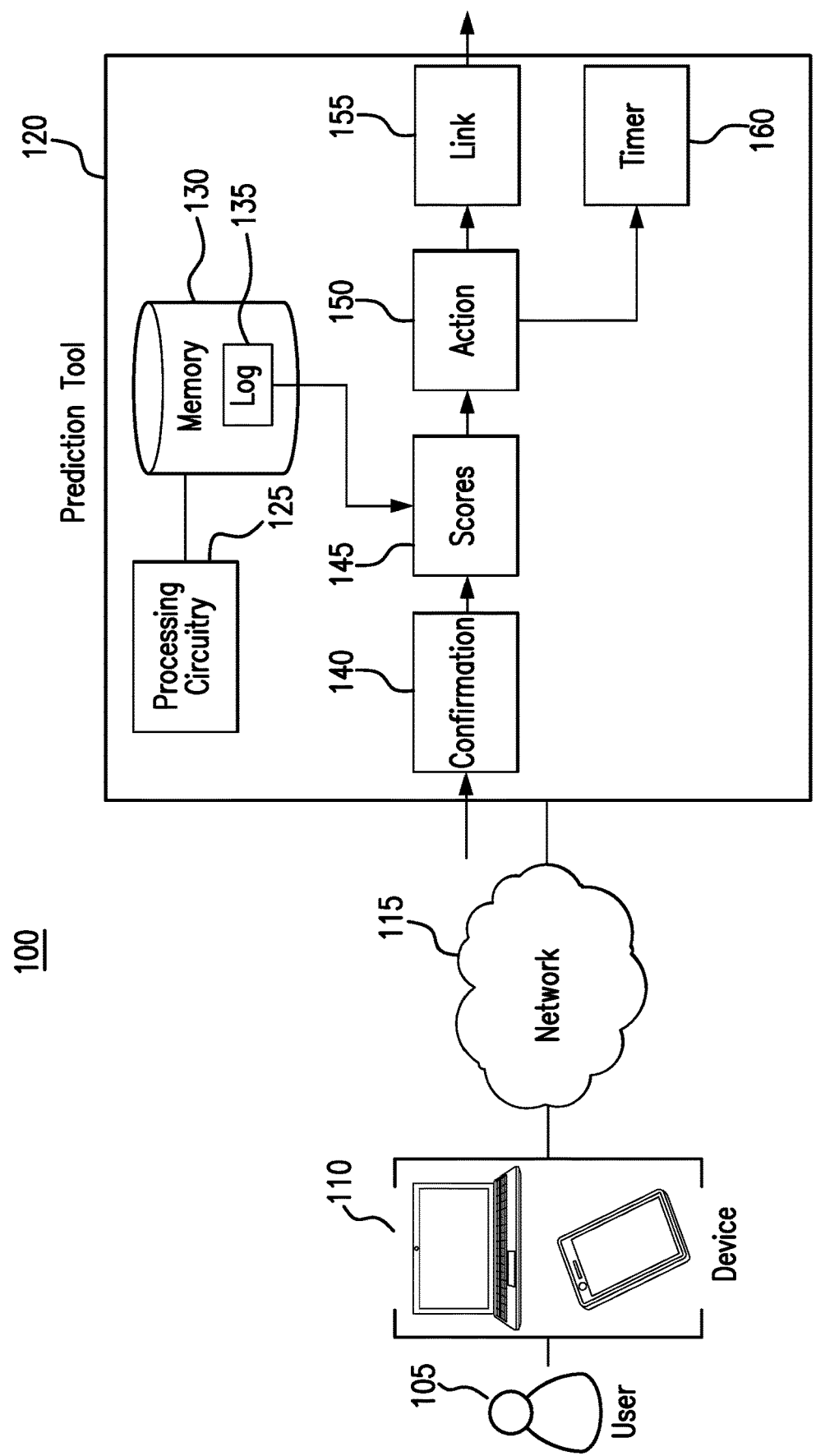
FIG. 1 illustrates an example system.

FIG. 1 illustrates an example system 100. As shown in FIG. 1, system 100 includes one or more devices 110, a network 115, and a prediction tool 120. Generally, system 100 predicts the actions that a user 105 is likely to perform and presents shortcuts and/or links for the user to perform the predicted action. In particular embodiments, system 100 reduces the processing resources and/or network bandwidth used to retrieve menus and pages that the user would otherwise navigate to perform a desired action. In some embodiments, system 100 reduces the amount of time a user spends navigating menus and pages to perform actions.

User 105 uses device 110 to perform actions in system 100. For example, user 105 may interact with an application executed by device 110 to perform actions on device 110. This disclosure contemplates user 105 using device 110 to perform any suitable action. For example, user 105 may use device 110 to check email, send messages, pay bills, transfer funds, and/or check information. In some instances, the application executed by device 110 may require user 105 to navigate several menus and/or pages to perform a desired action. In these instances, device 110 expends processor and/or network resources to retrieve and/or load menus and/or pages for user 105. User 105 also spends additional time navigating menus and/or pages, so that user 105 can perform the desired action. For example, to pay a bill, user 105 may need to navigate a main menu and select a link for paying bills. Then, after a bill paying page loads, user 105 may need to select the bill that user 105 wants to pay. Then, after a page loads for that specific bill, user 105 may need to confirm payment. Retrieving and loading each of these pages uses processing and network resources as well as the user's time.

Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Prediction tool 120 predicts the actions that user 105 is likely to perform and presents links and/or shortcuts for user 105 to quickly perform those actions. As seen in FIG. 1, prediction tool 120 includes processing circuitry 125 and memory 130. This disclosure contemplates processing circuitry 125 and memory 130 being configured to perform any of the functions of prediction tool 120 described herein. In particular embodiments, prediction tool 120 reduces the processing and network resources used to retrieve and/or load menus and/or pages when a user 105 desires to perform an action on device 110.

Processing circuitry 125 is any electronic circuitry, including, but not limited to microprocessors, application specific integrated circuits (ASIC), application specific instruction set processor (ASIP), and/or state machines, that communicatively couples to memory 130 and controls the operation of prediction tool 120. Processing circuitry 125 may be 8-bit, 16-bit, 32-bit, 64-bit or of any other suitable architecture. Processing circuitry 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processing circuitry 125 may include other hardware that operates software to control and process information. Processing circuitry 125 executes software stored on memory to perform any of the functions described herein. Processing circuitry 125 controls the operation and administration of prediction 120 by processing information received from devices 110, network 115, and memory 130. Processing circuitry 125 may be a programmable logic device, a microcontroller, a microprocessor, any suitable processing device, or any suitable combination of the preceding. Processing circuitry 125 is not limited to a single processing device and may encompass multiple processing devices.

Memory 130 may store, either permanently or temporarily, data, operational software, or other information for processing circuitry 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processing circuitry 125 to perform one or more of the functions described herein.

Prediction tool 120 stores a log 135 in memory 130. Log 135 includes a history of actions performed by user 105 and other users in system 100. Log 135 may include information, such as the action performed by a user and a date or time when the action was performed. Prediction tool 120 uses log 135 to determine what actions a user 105 is likely to perform at a given time. Prediction tool 120 updates log 135 when a user performs an action so that log 135 includes a record of the performed action. Log 135 may also include indicators of when certain actions were performed correctly or incorrectly by prediction tool 120. These indicators can be used by prediction tool 120 to more accurately predict desired actions in the future. For example, log 135 may include a history of scores used in predicting actions, as described below.

In some embodiments, user 105 may be linked to a user account. Prediction tool 120 identifies user 105 through the user account. Prediction tool 120 also uses the user account to predict what actions are likely to be performed by the user 105. For example, entries or records in log 135 may be grouped by user account. User 105 may access the user account by logging in to the user account. For example, user 105 may provide a username, password, biometric authenticators, and/or other information linked to the user account. After user 105 has accessed the user account, user 105 may be allowed to perform actions on device 110 that pertain to the user account.

Prediction tool 120 receives a confirmation 140. Confirmation 140 may indicate that user 105 has connected to an application that uses prediction tool 120. For example, confirmation 140 may indicate that user 105 has logged into a user account using an application on device 110. As another example, confirmation 140 may indicate that user 105 has launched an application on device 110. Prediction tool 120 may predict actions that are likely to be performed by user 105 in response to receiving confirmation 140. Confirmation 140 may also indicate a date and/or time when user 105 connected to the application. An example algorithm for receiving confirmation 140 is as follows: wait for an incoming message, receive an incoming message over network 115, determine that the incoming message is a confirmation 140.

In response to receiving confirmation 140, prediction tool 120 uses information in log 135 to produce scores 145. Scores 145 indicate the likelihood that particular actions in log 135 will be performed by user 105. Scores 145 may correlate to the time of confirmation 140. For example, confirmation 140 may indicate a time of user login or a time that an application was launched. That time may be used by prediction tool 120 to generate scores 145 for actions indicated by log 135. An example algorithm for generating scores 145 is as follows: determine a user or user account from confirmation 140, determine a time from confirmation 140, determine an action from log 135 that is tied to the user account, determine a score for the action based on a time linked to the action in log 135 and the time from confirmation 140.

Prediction tool 120 determines an action 150 that is most likely to be performed by user 105 based on scores 145. In some embodiments, action 150 has a score 145 that is higher than the scores 145 for other actions indicated by log 135. By determining that action 150 is more likely to be performed than other actions in log 135, prediction tool 120 can predict that user 105 is likely to perform action 150. An example algorithm for determining action 150 is as follows: rank actions from log 135 for a particular user account based on the scores 145 for each action, determine the action with the highest score 145, select the action with the highest score 145.

Prediction tool 120 generates a link 155 to perform action 150. Prediction tool 120 may communicate link 155 to device 110. Device 110 may then present link 155 to user 105. By activating link 155, user 105 may cause action 150 to be performed. In this manner, user 105 does not need to navigate menus and/or pages to perform action 150. Instead, user 105 can cause action 150 to be performed by activating link 155. An example algorithm for generating and communicating link 155 is as follows: determine the action 150 that is most likely to be performed by user 105, create a link 155 that causes action 150 to be performed when the link 155 is activated, package link 155 into a message, communicate the message over network 115 to device 110.

Prediction tool 120 starts a timer 160 corresponding to link 155. Timer 160 indicates the amount of time that has transpired since prediction tool 120 generated and/or communicated link 155 to device 110. Prediction tool 120 may start timer 160 at any suitable time, such as for example, when link 155 is generated and/or when link 155 is communicated to device 110. In some embodiments, as timer 160 progresses, prediction tool 120 and/or device 110 may cause link 155 to fade on device 110. Additionally, prediction tool 120 may gradually reduce the score 155 for action 150 as timer 160 progresses. In this manner, prediction tool 120 determines that the determined action 150 is less likely to be performed the longer that link 155 is presented to user 105 and the user 105 does not activate link 155. In some embodiments, timer 160 stops when user 105 activates link 155. In some embodiments, prediction tool 120 determines another action 150 and generates another link 155 if timer 160 exceeds a certain limit and/or threshold. An example algorithm for timer 160 is as follows: communicate link 155 to device 110, start a timer 160, reduce score 145 as timer 160 progresses, determine whether timer 160 has exceeded a threshold, if timer 160 has exceeded a threshold, determine another action 150 and generate another link 155.

Figure 2:
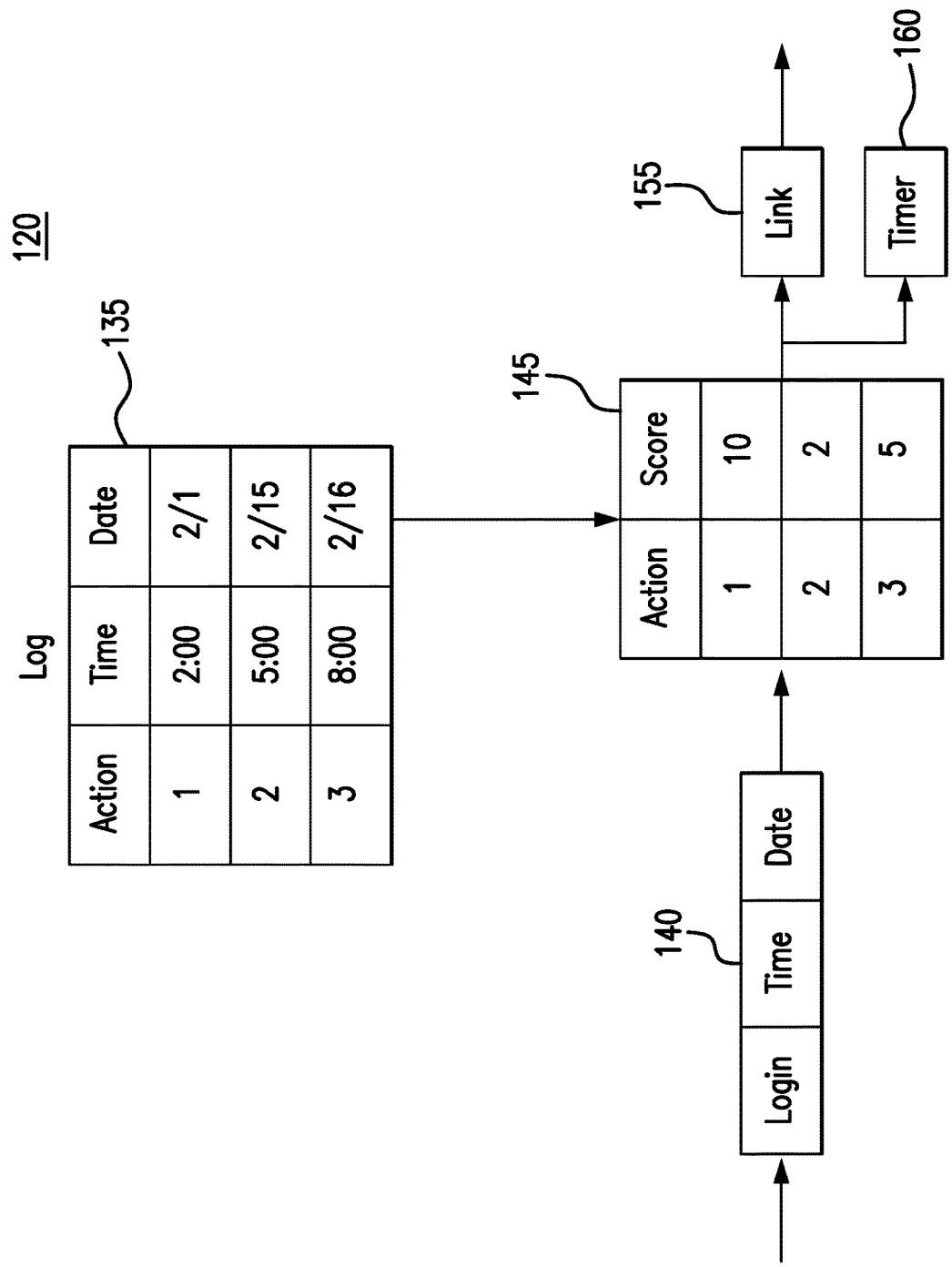
FIG. 2 illustrates an example prediction tool of the system of FIG. 1.

FIG. 2 illustrates an example prediction tool 120 of the system 100 of FIG. 1. As shown in FIG. 2, prediction tool 120 maintains a log 135. Log 135 is used with confirmation 140 to generate scores 145. Scores 145 are then used to generate a link 155. Additionally, a timer 160 is used after link 155 has been communicated to a device. In particular embodiments, prediction tool 120 reduces the amount processing resources and network bandwidth used to retrieve and/or load menus and pages for a user to perform a desired action. In some embodiments, prediction tool 120 reduces the amount of time a user spends navigating menus and pages to perform a desired action.

Log 135 stores a history of actions performed by users. In some embodiments, the actions in log 135 are grouped by user accounts of different users. Log 135 also indicates a date and/or time when particular actions were performed. In the illustrated example of FIG. 2, log 135 includes three actions: action 1, action 2, and action 3. These actions may be different from each other. Log 135 also includes a time and a date when each action was performed. As seen in FIG. 2, action 1 was performed on February 1st at two o'clock. Action 2 was performed on February 15th at five o'clock. Action 3 was performed on February 16th at eight o'clock. When a user performs an action, prediction tool 120 adds the action, along with the date and time when that action was performed, to log 135. In this manner, log 135 tracks the actions that have been performed in system 100.

Prediction tool 120 receives a confirmation 140. Confirmation 140 may indicate that a user has performed a certain action to connect with prediction tool 120. For example, confirmation 140 may indicate that a user has logged in using the user's device. As another example, confirmation 140 may indicate that a user has launched an application using the user's device. In the illustrated example of FIG. 2, confirmation 140 indicates that a login has occurred. Confirmation 140 also indicates a time and a date of the login. This disclosure contemplates confirmation 140 indicating any appropriate event. For example, confirmation 140 may indicate that a user has launched an application, along with the date and time when the user launched the application. Confirmation 140 may also indicate a user account for a user. Prediction tool 120 may use the user account information to retrieve the actions in log 135 that correspond to that user account.

Prediction tool 120 determines scores 145 for actions in log 135 based on information in confirmation 140. In some embodiments, prediction tool 120 determines scores 145 for actions that correspond to a particular user account indicated by confirmation 140. Prediction tool 120 may score actions in log 135 based on the date and time in confirmation 140. For example, if the date and/or time in confirmation 140 corresponds with the date of an action in log 135, then that action may receive a higher score. Conversely, if the date and/or time in confirmation 140 does not correspond to a date and/or time in log 135, then an action may receive a lower score. In the illustrated example of FIG. 2, prediction tool 120 determines that action 1 has a score of 10, action 2 has a score of 2, and action 3 has a score of 5. In some embodiments, these scores 145 may indicate that action 1 is more likely to be performed by the user than actions 2 and 3. Likewise, the scores 145 indicate that action 3 is more likely to be performed by the user than action 2. Based on these scores 145, prediction tool 120 may determine that action 1 should be selected as the predicted action.

As an example operation, action 1 may be paying a mortgage. Log 135 may indicate that a user pays the mortgage on the first date of every month. Action 2 may be paying a credit card bill. Log 135 may indicate that a user pays the credit card bill on the 15th of every month. Additionally, action 3 may be a balance transfer. Log 135 may indicate that a user tends to perform a balance transfer around 8 o'clock in the evening. The user may login at a particular date and time. If the user logs in on the first day of the month, such as for example, March 1st, prediction tool 120 may examine log 135 and determine that because the user tends to pay the mortgage on the first day of the month, that the user is likely logging in to pay the mortgage. As a result, prediction tool 120 may assign a high score to action 1. As another example, the user may have logged in in the evening. As a result, prediction tool 120 may determine that because the user tends to perform balance transfers in the evening, that the user may be logging in to perform a balance transfer. In response, prediction tool 120 may assign a higher score to action 3. In the illustrated example of FIG. 2, action 1 receives a higher score than action 3.

Prediction tool 120 selects the action that is most likely to be performed (e.g., the action with the highest score 145) as the predicted action. In the illustrated example of FIG. 2, prediction tool 120 selects action 1 as the predicted action because action 1 has a higher score 145 than actions 2 and 3. In some embodiments, prediction tool 120 may select the action with the lowest score rather than the highest score. After prediction tool 120 selects an action, prediction tool 120 generates a link 155. Link 155 may cause the predicted action to be performed when a user activates link 155. Prediction tool 120 communicates link 155 to a device of the user. Link 155 may be visible to the user. The user may activate link 155 to cause the predicted action to be performed.

After link 155 is generated and/or communicated, prediction tool 120 starts a timer 160. Prediction tool 120 may stop timer 160 when link 155 is activated. As timer 160 progresses, prediction tool 120 may determine that the user has not activated link 155 for a certain period of time. The longer the user does not activate link 155, prediction tool 120 may determine that the predicted action is less likely to be correct. As a result, prediction tool 120 may cause certain actions to be performed as timer 160 progresses. For example, prediction tool 120 may cause link 155 to fade on the display of the device of the user as timer 160 progresses. As another example, prediction tool 120 may gradually reduce the score of the selected action as timer 160 progresses. In certain embodiments, if the score of the selected action falls below the score of another action, prediction tool 120 may generate a new link 155 for the action with the new highest score. Prediction tool 120 may then communicate the new link 155 to the device so that the user can activate the new link 155 to cause the new predicted action to be performed.

In some embodiments, prediction tool 120 can update log 135 based on how the user interacts with link 155. For example, if the user activates link 155, thus indicating that the predicted action was correct, prediction tool 120 may indicate in log 135 that the action was predicted correctly and thus should receive a higher score in the future. Conversely, if the user does not activate link 155, prediction tool 120 may update log 135 to indicate that the action was predicted incorrectly and, in the future, should receive a lower score. In some embodiments, log 135 may track a record of scores for certain actions. Prediction tool 120 may use this record of scores to generate future scores 145. For example, if a record of scores indicates that prediction tool 120 has been scoring a particular action too high, then in the future, prediction tool 120 may score that action lower. In this manner, the record of scores allows prediction tool 120 to take corrective action and to improve the accuracy of future predictions.

In certain embodiments, if link 155 is not activated, prediction tool 120 may return to scores 145 to determine the action that is next most likely to be performed by the user. In the illustrated example of FIG. 2, if the link 155 for action 1 is not activated, prediction tool 120 may determine that action 3 is more likely to be performed than action 2. In response, prediction tool 120 may generate link 155 that causes action 3 to be performed when activated by the user. Prediction tool 120 then communicates the link 155 for action 3 to the device of the user. The link 155 for action 3 may then replace the link 155 for action 1 on the display of the device of the user. The user may then activate the link 155 for action 3 to cause action 3 to be performed.

Figure 3A:
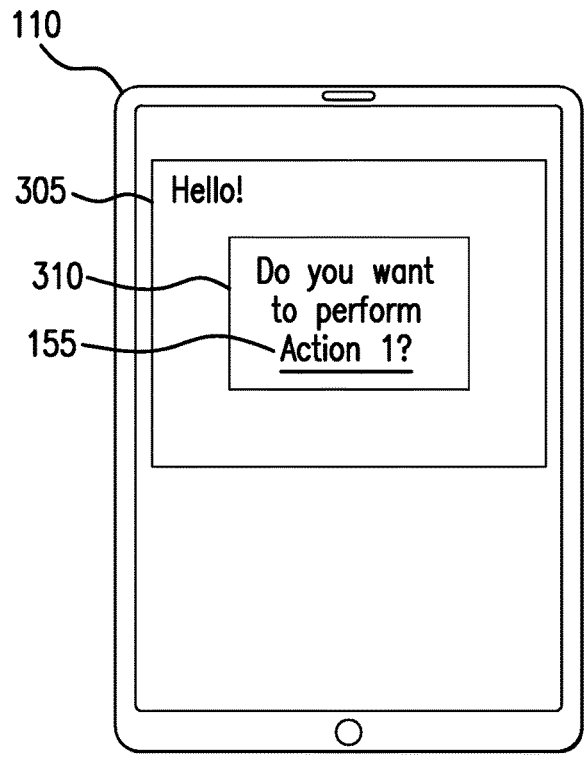
FIGS. 3A-3C illustrate an example device of the system of FIG. 1.

FIG. 3A illustrates and example device 110 of the system 100 of FIG. 1. As seen in FIG. 3A, device 110 is executing an application 305 that presents a message on the screen that says "hello". Application 305 also presents a message 310 that indicates an action to be performed. Within message 310 is a link 155. Message 310 may indicate that activating link 155 performs a particular action. In the illustrated example of FIG. 3A, message 310 indicates that activation of link 155 performs action 1. The user may activate link 155, such as for example, by tapping link 155 on the display of device 110. If the user activates link 155, device 110 may cause action 1 to be performed.

Figure 3B:
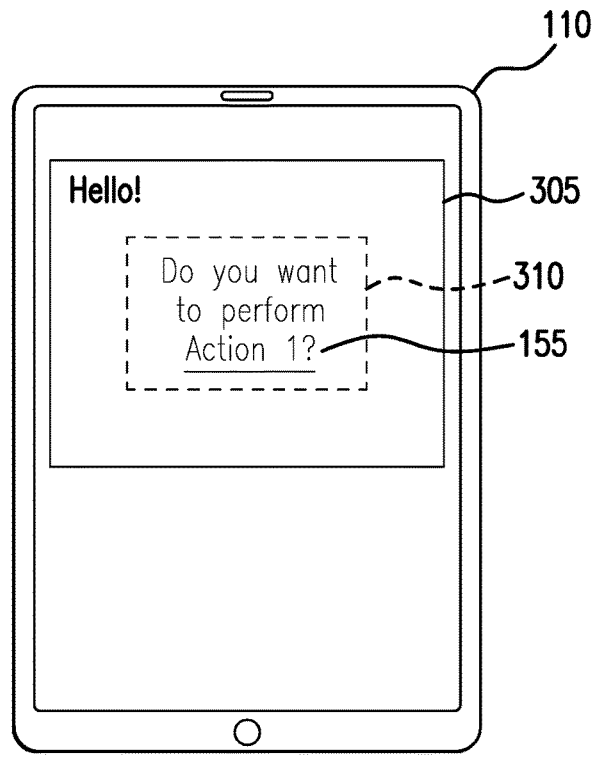

FIG. 3B illustrates an example device 110 of the system 100 of FIG. 1. As seen in FIG. 3B, message 310 fades if the user does not activate link 155. Message 310 may fade gradually the longer the user does not activate link 155. The fading represents an indication that action 1 is less likely to be the correctly predicted action. In some embodiments, if the user does not activate link 155 within a certain amount of time, message 310 may fade completely from the display of device 110. For clarity, the fading of message 310 is shown in FIG. 3B using dashed lines. Link 155 is also shown as fading through a lighter font.

Figure 3C:
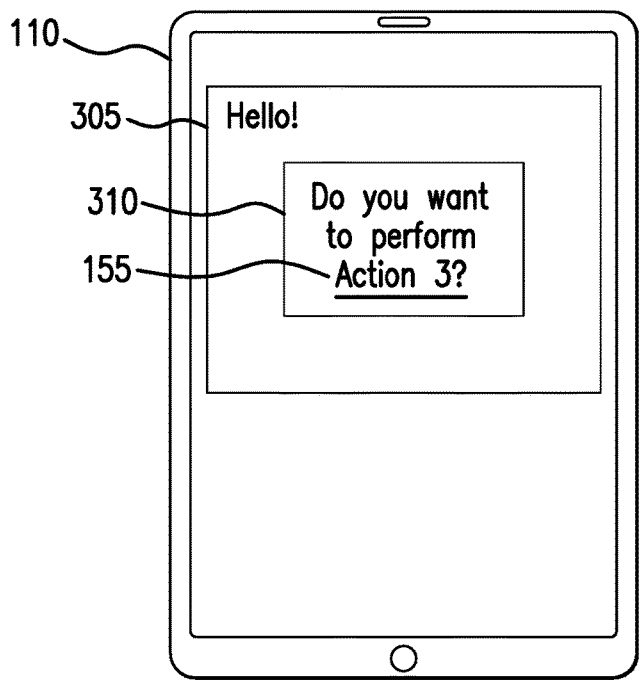

FIG. 3C illustrates an example device 110 of the system 100 of FIG. 1. As seen in FIG. 3C, application 305 presents a new message 310 to the user. Message 310 indicates that activation of link 155 causes action 3 to be performed. In certain embodiments, device 110 presents the message 310 of FIG. 3C after the message 310 of FIG. 3B has faded and/or has been removed from the display of device 110. Message 310 in FIG. 3C may indicate a determination that action 3 is the next most likely to be performed action after action 1. The user may activate link 155 in FIG. 3C to cause action 3 to be performed.

Figure 4:
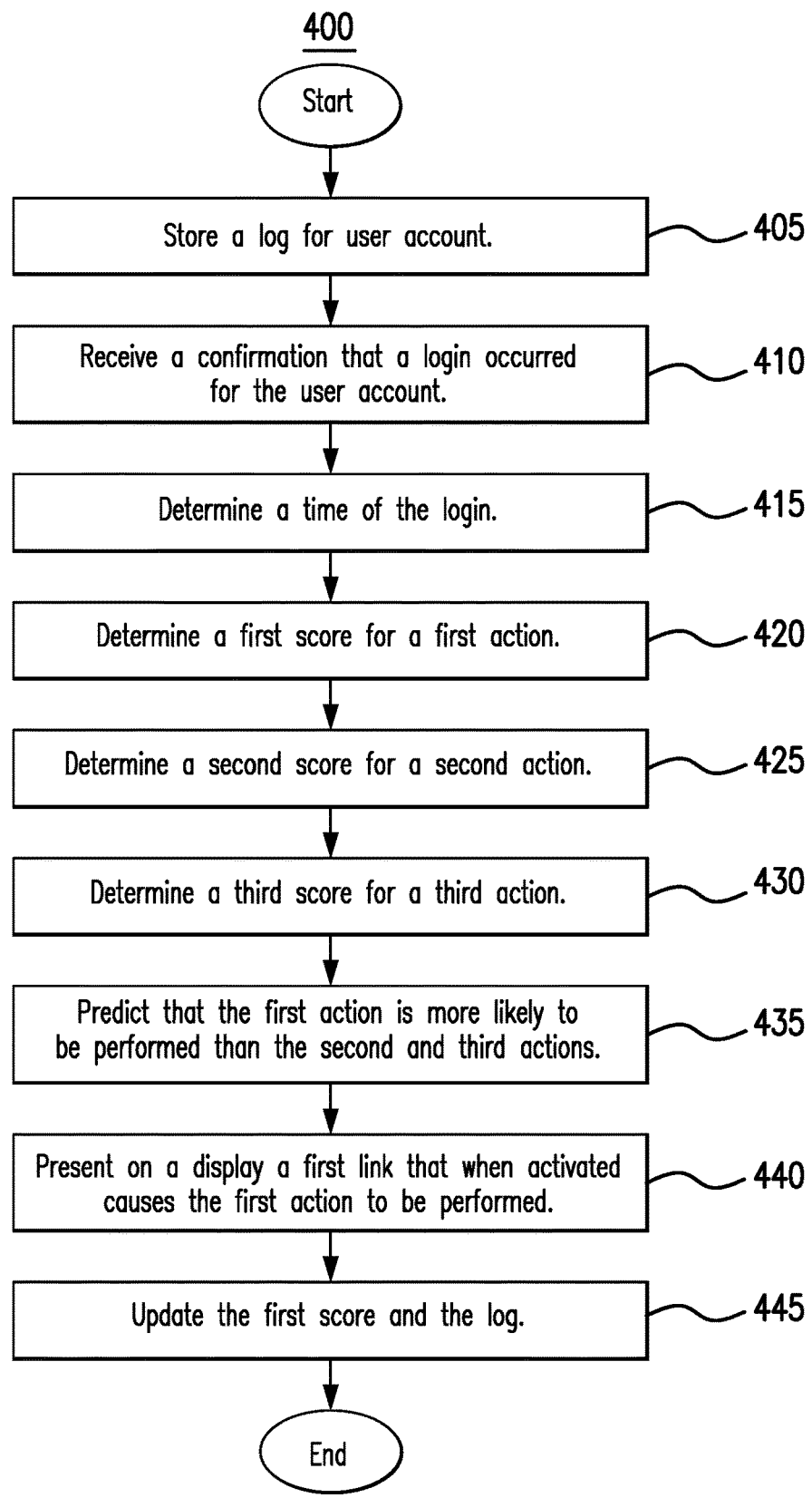
FIG. 4 is a flowchart illustrating a method for predicting actions using the system of FIG. 1.

FIG. 4 is a flow chart illustrating a method 400 for predicting actions using the system 100 of FIG. 1. In particular embodiments, prediction tool 120 performs the steps of method 400. By performing the steps of method 400, prediction tool 120 reduces the processing and network resources used to retrieve and/or load menus and/or pages that a user navigates to perform a desired action.

Prediction tool 120 begins by storing a log for a user account in step 405. In step 410, prediction tool 120 receives a confirmation that login occurred for the user account. Prediction tool 120 determines the time of the login in step 415.

Prediction tool 120 determines a first score for a first action in step 420. In step 425, prediction tool 120 determines a second score for a second action. Prediction tool 120 determines a third score for a third action in step 430. In each of these determinations, prediction tool 120 may determine a score based on a date and time indicated by the log, and a date and time indicated by the confirmation. In step 435, prediction tool 120 predicts that the first action is more likely to be performed than the second and third actions. Prediction tool 120 may make this determination by comparing the scores for each of these actions. In some embodiments, the action with the highest score is selected by prediction tool 120 as the action that is more likely to be performed than the other actions. Prediction tool 120 presents on the display a first link that, when activated, causes the first action to be performed in step 440. A user may activate this link to cause the first action to be performed. In some embodiments, if the user does not activate the first link, then the first link may begin to fade on the display of the device until the first link is completely removed from the display. In these instances, prediction tool 120 may generate and communicate a second link that causes another action to be performed when the second link is activated.

In step 445, prediction tool 120 updates the first score and the log. In some embodiments, prediction tool 120 updates the first score based on how the user interacts with the first link. For example, if the user activates the first link, prediction tool 120 may increase the first score indicating that the prediction was correct. If the user does not activate the first link, prediction tool 120 may decrease the first score indicating that the prediction was incorrect. After the first score is updated, prediction tool 120 may update the log to indicate whether the prediction was correct or not. This update to the log will allow future predictions to score the first action higher if the prediction was correct or lower if the prediction was incorrect.

Modifications, additions, or omissions may be made to method 400 depicted in FIG. 4. Method 400 may include more, fewer, or other steps. For example, steps may be performed in parallel or in any suitable order. While discussed as messaging tool 120 performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store a log for a user account, the log comprising:
a first action performed by a user of the user account;
a first date on which the first action was performed;
a second action performed by the user of the user account;
a second date on which the second action was performed;
a third action performed by the user of the user account; and
a third date on which the third action was performed; and
processing circuitry communicatively coupled to the memory, the processing circuitry configured to:
receive a confirmation that a login occurred for the user account;
determine, based on the confirmation, a time of the login;
determine, based on the time of the login and the first date, a first score for the first action;
determine, based on the time of the login and the second date, a second score for the second action;
determine, based on the time of the login and the third date, a third score for the third action;
predict, based on the first score, the second score, and the third score, that the first action is more likely to be performed than the second action and the third action; and
in response to the prediction that the first action is more likely to be performed than the second action and the third action, present, on a display, a first link that when activated, causes the first action to be performed;
wherein the processing circuitry is further configured to:
start a timer;
as the timer runs, fade the first link on the display if the first link has not been activated, wherein the first link fades more the longer the timer runs and the longer the first link has not been activated; and
remove the first link from the display in response to the timer expiring.

2. The apparatus of claim 1, wherein the processing circuitry is further configured to stop the timer when the first link is activated.

3. The apparatus of claim 1, wherein the processing circuitry is further configured to reduce the first score as the timer runs.

4. The apparatus of claim 1, wherein the processing circuitry is further configured to:
determine that the first link was not activated;
in response to the determination that the first link was not activated, determine, based on the second score and the third score, that the second action is more likely to be performed than the third action; and
in response to the determination that the second action is more likely to be performed than the third action, present a second link on the display that when activated causes the second action to be performed.

5. The apparatus of claim 4, wherein the processing circuitry is further configured to remove the first link from the display before presenting the second link on the display.

6. The apparatus of claim 1, wherein the processing circuitry is further configured to present on the display a message that indicates that activating the first link will cause the first action to be performed.

7. A method comprising:
storing, by a memory, a log for a user account, the log comprising:
a first action performed by a user of the user account;
a first date on which the first action was performed;
a second action performed by the user of the user account;
a second date on which the second action was performed;
a third action performed by the user of the user account; and
a third date on which the third action was performed;
receiving, by processing circuitry communicatively coupled to the memory, a confirmation that a login occurred for the user account;
determining, by the processing circuitry, based on the confirmation, a time of the login;
determining, by the processing circuitry, based on the time of the login and the first date, a first score for the first action;
determining, by the processing circuitry, based on the time of the login and the second date, a second score for the second action;
determining, by the processing circuitry, based on the time of the login and the third date, a third score for the third action;
predicting, by the processing circuitry, based on the first score, the second score, and the third score, that the first action is more likely to be performed than the second action and the third action;
in response to the prediction that the first action is more likely to be performed than the second action and the third action, presenting, on a display, a first link that when activated, causes the first action to be performed;
starting a timer;
as the timer runs, fading the first link on the display if the first link has not been activated, wherein the first link fades more the longer the timer runs and the longer the first link has not been activated; and
removing the first link from the display in response to the timer expiring.

8. The method of claim 7, further comprising stopping the timer when the first link is activated.

9. The method of claim 7, further comprising reducing the first score as the timer runs.

10. The method of claim 7, further comprising:
determining that the first link was not activated;
in response to the determination that the first link was not activated, determining, based on the second score and the third score, that the second action is more likely to be performed than the third action; and
in response to the determination that the second action is more likely to be performed than the third action, presenting a second link on the display that when activated causes the second action to be performed.

11. The method of claim 10, further comprising removing the first link from the display before presenting the second link on the display.

12. The method of claim 7, further comprising presenting on the display a message that indicates that activating the first link will cause the first action to be performed.

13. A system comprising:
a device comprising a display; and
a prediction tool comprising a memory and processing circuitry configured to:
store a log for a user account, the log comprising:
a first action performed by a user of the user account;
a first date on which the first action was performed;
a second action performed by the user of the user account;
a second date on which the second action was performed;
a third action performed by the user of the user account; and
a third date on which the third action was performed;
receive a confirmation that a login occurred for the user account;
determine, based on the confirmation, a time of the login;
determine, based on the time of the login and the first date, a first score for the first action;
determine, based on the time of the login and the second date, a second score for the second action;
determine, based on the time of the login and the third date, a third score for the third action;
predict, based on the first score, the second score, and the third score, that the first action is more likely to be performed than the second action and the third action; and
in response to the prediction that the first action is more likely to be performed than the second action and the third action, present, on the display, a first link that when activated, causes the first action to be performed;
wherein the prediction tool is further configured to:
start a timer;
as the timer runs, fade the first link on the display if the first link has not been activated, wherein the first link fades more the longer the timer runs and the longer the first link has not been activated; and
remove the first link from the display in response to the timer expiring.

14. The system of claim 13, wherein the prediction tool is further configured to stop the timer when the first link is activated.

15. The system of claim 13, wherein the prediction tool is further configured to reduce the first score as the timer runs.

16. The system of claim 13, wherein the prediction tool is further configured to:
determine that the first link was not activated;
in response to the determination that the first link was not activated, determine, based on the second score and the third score, that the second action is more likely to be performed than the third action; and
in response to the determination that the second action is more likely to be performed than the third action, present a second link on the display that when activated causes the second action to be performed.

17. The system of claim 16, wherein the prediction tool is further configured to remove the first link from the display before presenting the second link on the display.

* * * * *